United States Patent [19]

Fennemann et al.

[11] Patent Number: 5,198,020

[45] Date of Patent: Mar. 30, 1993

[54] REMOVAL OF ZINC FROM PHOSPHATING PROCESS SLUDGES

[75] Inventors: Wolfgang Fennemann, Karben; Rolf Kola, W-Düsseldorf; Dieter Jentsch, Langen, all of Fed. Rep. of Germany

[73] Assignee: Metallgesellschaft Aktiengesellschaft, Frankfurt am Main, Fed. Rep. of Germany

[21] Appl. No.: 818,011

[22] Filed: Jan. 8, 1992

[30] Foreign Application Priority Data

May 30, 1991 [DE] Fed. Rep. of Germany ....... 4117716

[51] Int. Cl.$^5$ .............................................. C22B 19/04
[52] U.S. Cl. .................................... 75/658; 75/659; 75/662; 423/299
[58] Field of Search ................. 75/654, 655, 656, 658, 75/659, 660, 661, 662, 10.3, 10.31, 10.32, 431, 658, 659, 662; 423/299

[56] References Cited

U.S. PATENT DOCUMENTS

| | | | |
|---|---|---|---|
| 3,653,875 | 4/1972 | Waters et al. | 75/419 |
| 4,123,257 | 10/1978 | Fukuoka et al. | 75/500 |
| 4,360,380 | 11/1982 | Zarur | 75/426 |
| 4,537,756 | 8/1985 | Röttgen et al. | 423/323 |
| 4,986,977 | 1/1991 | Peters | 75/431 |

FOREIGN PATENT DOCUMENTS

| | | |
|---|---|---|
| 0131848 | 1/1985 | European Pat. Off. . |
| 3719583 | 12/1988 | Fed. Rep. of Germany . |
| 3925838 | 2/1991 | Fed. Rep. of Germany . |
| 2317221 | 2/1977 | France . |
| 1545515 | 5/1979 | United Kingdom . |

*Primary Examiner*—Melvyn J. Andrews
*Attorney, Agent, or Firm*—Felfe & Lynch

[57] ABSTRACT

Disclosed is a process of removing zinc from a phosphating process sludge wherein the phosphating process sludge is mixed with an additive adapted to form slaglike compounds of iron, calcium and/or barium with the phosphorus component of the phosphating process sludges. The mixture is reacted at temperatures of at least 800° C. under reducing conditions. A previous agglomeration, particularly pelletizing, of the mixture will be of advantage. For a formation of iron compounds it will be particularly desirable to employ reaction temperatures of at least 900° C., preferably of at least 1000° C. and most preferably of at least 1100° C. Metallurgical dusts are particularly suitable additives. For a formation of iron compounds it will be desirable to select a Fe:P molar ratio of at least 1.0 in case of a reaction temperature of $\leq 950°$ C., of at least 1.5 in case of a reaction temperature of 950° to 1050° C., and of at least 2.0 in case of a reaction temperature $\geq 1050°$ C.. For a formation of Ca and/or Ba compounds a molar ratio of Ca:P or Ba:P equal to or higher than 1.5 should be selected. The process can be integrated to special advantage in the waelz processing of metallurgical dusts.

14 Claims, No Drawings

REMOVAL OF ZINC FROM PHOSPHATING PROCESS SLUDGES

BACKGROUND OF THE INVENTION

The present invention is in a process of removing zinc from a zinc containing sludge formed in a phosphating process. The process of the invention is conducted at elevated temperatures and under reducing conditions in the presence of additives. The invention also includes the use of the process in the Waelz processing of metallurgical residual dusts.

Phosphating processes using zinc phosphate solutions are widely used in the metal-working industry on a large variety of metal surfaces. The phosphate layers formed on metals by that process serve particularly to facilitate sliding and non-cutting cold working, for protection against corrosion, and for improving the adherence of paint. In a phosphating process the desired conversion layer is formed on the metal surface. However, a phosphating process sludge, which must be removed periodically from the treating baths, is also formed. In a dried state, the sludge formed during the treatment of steel and iron has the following composition: 2 to 20% Zn; 10 to 30% Fe; 30 to 45% $P_2O_5$. In the phosphating of zinc surfaces, the sludge will contain about 38 to 45% Zn. In addition to the foregoing main components, the sludge, depending on the specific phosphating bath composition, may also contain small amounts of Na, Mn, Ni, Ca, Cu, Co and other cations. The sludge may also contain small amounts of anions, such as $NO_3^-$, $Cl^-$, and $F^-$.

The phosphating process sludge settles in the phosphating bath and has a residual moisture content of 60 to 95%. That residual moisture content can be decreased to 30 to 50% if the sludge is squeezed out. The sludge can be dried to a moisture content of less than 10%.

The formation of sludge in the phosphating process results in disadvantages. Two major disadvantages are that the sludge binds a portion of the bath chemicals and the sludge must be disposed of as hazardous waste because of its heavy metal content. For this reason, there have been efforts to develop a process to recover the valuable substances from the sludge and to decrease the amount of waste to be disposed.

For instance, DE-A-2629776 describes a wet chemical process of treating the phosphating process sludge. That process has not yet been commercially accepted because of its economics and difficult processing technology.

U.S. Pat. No. 3,653,875 proposes treating the sludge with an alkali and reducing the solids thus obtained at 500° to 1300° C. to recover zinc. Trisodium phosphate can be washed out of the residue. That process also has not been commercially accepted because it is expensive as it requires a plurality of steps.

It is an object of the invention to provide a process by which the valuable substances phosphorus and zinc contained in the phosphating process sludge are transformed into a usable form.

It is another object of the invention to provide such a process which does not result in waste waters.

It is a further object of the invention to provide a process which can be carried out in a particularly simple manner

THE INVENTION

The above-stated objects are accomplished in that a phosphating process sludge is mixed and reacted at temperatures of at least 800° C. with one or more additives which are adapted to form slaglike compounds of iron, calcium and/or barium with the phosphorus component of the phosphating process sludge. Slaglike compounds are solid, non-volatile, compounds of a high hardness which are free of dissolvable constituents.

Various simultaneous reactions occur during the reducing thermal treatment depending on the composition of the phosphating process sludge, the additives and fuel and/ or reducing agent. These reactions include preferential reactions, lower-ranking reactions and temperature-dependent reactions so that different amounts of additives are required and different slag compositions or slaglike compositions are obtained in dependence on the conditions employed. It has been found that barium reacts like calcium. For this reason in the following description calcium stands as a representative for calcium and barium and barium can be substituted for calcium. The molar ratios which are stated will be applicable to analytically pure components used in experiments carried out under optimum conditions and indicates minimum values.

| Components | | Kind of Reaction | Molar Ratio No. 1:No. 2 | Temperature °C. |
|---|---|---|---|---|
| No. 1 | No. 2 | | | |
| Ca | Si | preferential | 1.0 | 800 to 1300 |
| Fe | P | " | 1.0 | ≦1000 |
| Fe | P | " | 1.5 | 1000 to 1100 |
| Fe | P | " | 2.0 | ≧1100 |
| Ca | P | lower-ranking | 1.5 | 800 to 1300 |

It is apparent that
a) any silicon which is present preferentially reacts with calcium. This means that if phosphorus is to be combined with calcium in the presence of silicon, calcium is required in a correspondingly large excess;
b) a combination of the phosphorus content of the phosphate with iron is not disturbed by other components although the iron demand increases with temperature.

All stated molar ratios indicate minimum amounts. Various influences, such as the reactivity of the additives, the homogeneity of the mixture, the ability of the reactant to enter into contact, etc., may necessitate higher molar ratios, particularly if iron is the additive and if temperature fluctuations cannot be precluded. Under such conditions, it is recommended to use the highest stoichiometric molar ratio of Fe:P=2.0 and to provide for an additional margin of safety. The Fe-P compounds tend to rearrange in the form of compounds which have a lower P content at increasing temperatures so that phosphorus is released. This can be represented in a simplified form as follows (the temperature increases in the direction indicated by the arrows):

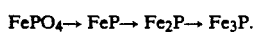

$FePO_4 \rightarrow FeP \rightarrow Fe_2P \rightarrow Fe_3P$.

In most cases, mixtures of these compounds will be obtained. $Fe_2P$ will not release phosphorus when heated. $Fe_2P$ will only be formed if sufficient Fe is present.

Other components may also participate in the reaction process and this may require additives in different amounts. Such other components are usually involved in lower-ranking reactions or form less stable compounds so that their action can be allowed for by using the reactant in excess which is a usual practice in commercial operations. For instance, aluminum tends to react like silicon so that somewhat more calcium should be added if calcium is used as an additive in the presence of large amounts of Al.

For this reason the nature of the additive to be employed depends on the presence and amount of accompanying components. For instance, when, e.g., $SiO_2$ is present in a large amount, Fe rather than calcium is the preferred additive. Many phosphating process sludges contain Fe and in that case a portion of the P will combine with Fe. In such cases the additive may be used in a correspondingly smaller amount.

In complex systems and in the presence of a large number of different components influencing each other, the required amount of additive is usually determined experimentally in a laboratory. In dependence on the accuracy of the metering achievable in a commercial operation, a corresponding surplus will be used in the production. The following general guidelines may be adopted to estimate the required amount of additive:
-if calcium (or an equivalent amount of barium) is used as an additive and iron is present, the total amount of phosphorus must be decreased by the amount which will preferentially react with the iron. In that case the following molar ratio can be employed:

| T(°C.) | Fe:P Molar Ratio |
|---|---|
| ≤950 | 1.0 |
| 950 to 1050 | 1.5 |
| ≥1050 | 2.0 |

Regardless of the intended reaction temperature the stoichiometric ratio of Ca:P of at least 1.5 will be required. It must be taken into account that any Si which is present will consume calcium at a molar ratio of Ca:Si=1.0 and that in accordance with the above remarks iron will combine with the phosphorus contained in the phosphating process sludge so that correspondingly less calcium will have to be added. A safety margin of 10 to 100% of the calcium demand depending on the conditions of operation is recommended.

The following results from the above:

If a phosphating process sludge which contains, e.g., 18.0% P, 15.0% Fe and 0.5% Ca is to be reacted with lime (having a Ca content of 38.5%) at 1100° C., and 0.4 metric t low-grade coke, which contains 3% Si, is to be consumed as fuel and reducing agent per metric t of phosphating process sludge, and if a calcium surplus of 25% is to be employed, the amount of lime required per 1000 kg of phosphating process sludge is 366 kg (calculated as Ca) or 951 kg (calculated as $CaCO_3$, if the lime contains 38.5% Ca).

If Fe is used as an additive and Ca is present the total amount of phosphorus must be reduced by the amount which can combine with the Ca. If Si is also present, the Ca content must first be decreased by the amount which will be consumed by the preferential reaction with Si at a molar ratio of Ca:Si=1.0. It is desirable to provide for a margin of safety of 10 to 100% based on the total amount of phosphorus.

If it is desired to react at 1000° C. a phosphating process sludge containing, e.g., 17.0% P, 11.0% Fe, and 3% Ca with an iron oxide that contains 68.5% Fe, 0.3 metric t coke containing 2.5% Si is used as a fuel and reducing agent per metric t of phosphating process sludge. If Fe is used in a surplus of 40% based on the total amount of phosphorus, iron oxide is required in an amount of 505 kg (calculated as Fe) or in an amount of 738 kg iron oxide which contains 68.5% iron.

If it is desired to use a phosphating process sludge containing 16.0% P and 8.0% Fe in a Waelz process plant in which metallurgical dust (23.0% Fe, 3.0% Ca, 1.5% Si) at a rate of 10,000 kg/h, sand (46.5% Si) at a rate of 1700 kg/h, and coke (1.3 Fe, 3% Si) at a rate of 3000 kg/h are processed at 1200° C. and part of the dust is to be replaced by phosphating process sludge, the following procedure may be adopted:

a) The amounts of all relevant components of the metallurgical dust are calculated as one component, the Fe, with an allowance for the sand added at a rate of 1700 kg/h.

The following is a calculation for 10,000 kg dust and 1700 kg sand:
  300 kg Ca;
  150 kg Si from the metallurgical dust;
  790 kg Si from the sand (1700 kg/h × 46.5% Si); and
  90 kg Si from the coke (3000 kg/h × 3.0% Si).
  210 kg Si are stoichiometrically required for binding the Ca. But Si is present in an amount of 1030 kg so that all Ca will combine with Si and will not be available for combining with P.

For this reason, P can be bound only by the Fe which is present and the amounts of the other components need not be taken into account in this case.

b) Making a list of various mixing ratios of phosphating process sludge and metallurgical dust.

The following Fe/P ratio is determined for 10% phosphating process sludge and 90% metallurgical dust:

| | kg Fe | kg P |
|---|---|---|
| 1000 kg phosphating process sludge | 80 | 160 |
| 9000 kg dust | 2070 | — |
| 3000 kg coke | 39 | — |
| Total | 2189 | 160 |

Fe:P molar ratio = 39.20:5.17
 = 7.58
Required Fe:P molar ratio = 2.0
Fe surplus $\frac{100 (7.58 - 2.0)}{2.0}$ = 279%.

The following Fe/P ratio is determined for 20% phosphating process sludge and 80% metallurgical dust:

| | kg Fe | kg P |
|---|---|---|
| 2000 kg phosphating process sludge | 160 | 320 |
| 8000 kg dust | 1840 | — |
| 3000 kg coke | 39 | — |
| Total | 2039 | 320 |

Fe:P molar ratio = 36.51:10.33
 = 3.53
Required Fe:P molar ratio = 2.0
Fe surplus $\frac{100 (3.53 - 2.0)}{2.0}$ = 76.5%

A continuation of the calculations for other mixing ratios results in the following table:

| Mixing ratio | | Molar ratio Fe:P | Fe Surplus at 1200° C. % |
|---|---|---|---|
| Phosphating process sludge | Dust | | |
| 10% | 90% | 7.58 | 279 |
| 15% | 85% | 4.88 | 144 |
| 20% | 80% | 3.53 | 77 |
| 25% | 75% | 2.72 | 36 |
| 30% | 70% | 2.18 | 9 |
| 35% | 65% | 1.80 | −10 |

These values may be plotted in a graph, from which the required mixing ratio can be read for any desired Fe surplus. For instance, it is apparent that if a Fe surplus of 100% is desired in the above example it will be necessary to use a mixture of 18% phosphating process sludge (1800 kg) and 82% dust (8200 kg).

In a preferred embodiment of the invention the phosphating process sludge is reacted at a reaction temperature of at least 900° C. and more preferably at a temperature of at least 1000° C., for formation of iron compounds. The most preferable reaction temperatures are at least 1100° C. A higher temperature will result in a higher reaction rate so that the throughput capacity of a given plant is increased.

In a further preferred embodiment of the invention, iron compounds are added for effecting the formation of slaglike iron compounds with the phosphorus components of the phosphating process sludge. The selected Fe/P molar ratios are 1.0 in case of a reaction temperature of $\leq 950°$ C., 1.5 for a reaction temperature of 950° to 1050° C., and 2.0 for a reaction temperature $\geq 1050°$ C.

To form the slaglike iron compound, particularly of iron phosphide in the highest possible concentration, the phosphating process sludge is preferably reacted with an iron oxide compound having a high iron content. Suitable iron compounds are, e.g., iron oxide ores or iron oxides formed, e.g., during the roasting of pyrites or the regeneration of pickling agents which contain hydrochloric or sulfuric acid. A reaction with roll scale or scrap may also be employed.

In a particularly preferred embodiment of the invention, the phosphating process sludge is reacted with metallurgical dust to form a slaglike iron compound. Such dust may be used to special advantage because it is available in large amounts. The dust contains zinc as a major component in addition to iron. The zinc content of the dust can then be volatilized together with the zinc content of the phosphating process sludge.

In another preferred embodiment of the invention the phosphating process sludge is reacted with an additive which contains Ca or Ba at a molar ratio of Ca:P or Ba:P $\geq 1.5$. That molar ratio will exactly be applicable only if the phosphating process sludge to be treated does not contain iron, which would preferentially form a slag with phosphorus. If the sludge also contains iron, the molar ratio of Ca:P or Ba:P can be decreased in dependence on the above-mentioned temperature-dependent ability of the iron to combine with phosphorus.

In a further preferred embodiment of the process of the invention, the mixed phosphating sludge and additive are compacted to form pellets, briquettes or similar agglomerates. In that case the feed materials can be handled more easily and metered more accurately. More particularly, the rate at which dust is entrained by the exhaust gas will be substantially decreased so that a purer zinc product will be obtained.

It is recommended that the reducing conditions be established by means of solid fuel. Particularly desirable solid fuels are coal, coke, coke breeze and the like. In that embodiment of the invention it is desirable to mix and particularly to agglomerate the solid fuel with the phosphating process sludge and the additives because in that case the reduction will take place not only on the surface but also in the interior of the agglomerates.

It is particularly desirable to integrate the process of the invention in the Waelz processing of metallurgical dusts. That integration affords considerable advantages because the metallurgical dusts subjected to the Waelz process have sufficiently high iron contents. Further, the particularly desirable high temperatures and the reducing conditions are employed in the Waelz process.

The process of the invention also has the advantage that it does not result in the formation of waste waters, which if formed, would require purification. Additionally, the processing sequence is simple. The phosphating process sludge and the additives may be mixed in the supply bins. The residual moisture content of the phosphating sludge should be so low that it is flowable. Excessive residual moisture can cause difficulties in metering because of thixotropic behavior. The sludge need not be neutralized at the place where it becomes available.

In dependence on the design of the reactor, the latter may be continuously or intermittently fed from the supply bins. The reaction can be conducted in any of the known reactors, such as short-drum furnaces, multiple-hearth furnaces or fluidized bed furnaces. Rotary kilns are preferred. The residual moisture in the phosphating process sludge may be expelled in the reactor so that an additional unit is not required for that purpose.

The fuel can serve two functions in the process of the invention. It can furnish heat of reaction but it can also participate in the reduction. In principle these two functions can be accomplished by a sole fuel. It is, however, possible or, sometimes necessary, to use two substances, one functioning as fuel to—by combustion—provide heat of reaction, and the other to participate in the reduction.

The choice of the fuel depends on the design of the reactor, since the kinetics of the reaction is influenced by the reactor. If the charged material is to be processed in a high layer as in a rotary kiln, the charge and the fuel should be mixed. If, however, the material is to be processed in a thin layer or as a suspension, as in a fluidized bed, a sole gaseous fuel can be used.

The reaction proper will proceed to completion at temperatures above 800° C. If a reducing atmosphere is maintained also in the gas space of the reactor, the zinc will be volatilized in an elementary form. If the atmosphere in the gas space is oxidizing, the zinc will be exhausted in the form of zinc oxide. The exhaust gas can be purified in accordance with the state of the art so that the volatilized zinc or zinc oxide can be re-used and the environment will not be polluted.

EXAMPLES

The tests were conducted in a tubular heater. The sample was introduced into the furnace on a boat and was held therein at a selected temperature under a reducing atmosphere for two hours.

Example 1

In that test run, phosphating process sludge was treated with pure $Fe_2O_3$ and coal at different temperatures and different molar ratios of Fe:P. In the calculation of the Fe:P molar ratio the Fe inherently contained in the phosphating process sludge was taken into account.

TABLE 1

| Temperature °C. | Molar ratio Fe:P | Volatilization Zn(%) | $P_2O_5$(%) |
|---|---|---|---|
| 900 | 0.5 | 11 | 6 |
|  | 1.0 | 21 | 2 |
|  | 1.5 | 59 | 2 |
|  | 2.0 | 74 | 2 |
| 1000 | 0.5 | 100 | 44 |
|  | 1.0 | 90 | 2 |
|  | 1.5 | 90 | 2 |
|  | 2.0 | 100 | 0 |
| 1100 | 0.5 | 100 | 78 |
|  | 1.0 | 100 | 50 |
|  | 1.5 | 100 | 25 |
|  | 2.0 | 100 | 0 |
|  | 3.0 | 100 | 0 |
| 1200 | 0.5 | 100 | 78 |
|  | 1.0 | 100 | 51 |
|  | 1.5 | 100 | 26 |
|  | 2.0 | 100 | 0 |

At 900° to 1000° C. a Fe:P molar ratio of 1.0 will be sufficient for binding virtually all P; a molar ratio of 2.0 will be required at higher temperatures. It is also interesting to note that the dezincking increases with an increasing amount of Fe at 900° C. At 1000° C. the dezincking will also be determined by the Fe:P molar ratio so that a Fe:P molar ration of $\geq 2.0$ should be selected if a complete volatilization of Zn is desired in conjunction with a complete binding of P.

The residues obtained in that case are Fe-P alloys and may be used in the steel making industry. They may be stored outdoors.

Example 2

In these test runs, metallurgical dust rather than pure $Fe_2O_3$ was used as an additive. Like in the Waelz process, quartz sand in an amount of 20% by weight referred to the mass of phosphating process sludge and metallurgical dust was used. Because Zn and Pb are recovered by volatilization in the Waelz process, the behavior of Pb was also ascertained.

TABLE 2

| Temperature °C. | Molar Ratio Fe:P | Volatilization Zn(%) | $P_2O_5$(%) | Pb(%) |
|---|---|---|---|---|
| 1000 | 1.2 | 100 | 14 | 99 |
|  | 1.5 | 100 | 2 | 100 |
|  | 2.1 | 100 | 2 | 100 |
| 1100 | 1.2 | 100 | 38 | 99 |
|  | 1.5 | 100 | 17 | 100 |
|  | 1.8 | 100 | 5 | 100 |
|  | 2.0 | 100 | 0 | 100 |
| 1200 | 1.2 | 100 | 40 | 100 |
|  | 1.5 | 100 | 20 | 100 |
|  | 1.8 | 100 | 5 | 100 |
|  | 2.1 | 100 | 1 | 100 |
|  | 3.25 | 100 | 0 | 100 |
| 1260 | 2.1 | 100 | 1 | 100 |

The tests reveal that when metallurgical dusts are used to slap P the required Fe:P molar ratio will be about 1.5 at 1000° C. and about 2.0 at higher temperatures. In all cases Zn as well as Pb were entirely volatilized so that the waelz process is not adversely affected by the co-use of phosphating process sludge.

The Fe-P compounds formed will be stable and no P will be volatilized if the Fe:P molar ratio is sufficiently high even at relatively high temperatures of up to 1300° C., such as the maximum temperatures which can be expected in a Waelz process.

X-ray diffractometer analysis revealed that all Ca contained in the metallurgical dust was present as silicate due to the high sand surplus. Calcium phosphate was not detected. Phosphorus was present only in the form of various iron phosphides. The slag did not contain elutable components and may be used, e.g., in the construction of roads and paths.

Example 3

This run was carried out for a comparison with Example 1; only the additive was changed. Pure $CaCO_3$ was used rather than pure $Fe_2O_3$. In parallel experiments with $BaCO_3$, which are not listed here, it is seen that Ba and Ca exhibit analogous reactions. For this reason the Ca indicated in Table 3 may be replaced entirely or in part by Ba in the same molar ratio. The phosphating process sludge which was employed has an inherent Fe content corresponding to a Fe:P molar ratio of 0.5 and also contained small amounts of Na and Mg.

TABLE 3

| Temperature °C. | Molar ratio Ca:P | Volatilization Zn(%) | $P_2O_5$(%) |
|---|---|---|---|
| 900 | 0 | 11 | 6 |
|  | 0.5 | 30 | 2 |
|  | 0.75 | 68 | 1 |
|  | 1.0 | 93 | 0 |
|  | 1.5 | 91 | 1 |
| 950 | 0 | 39 | 18 |
|  | 0.5 | 59 | 4 |
|  | 0.75 | 76 | 0 |
|  | 1.0 | 98 | 0 |
| 1000 | 0 | 100 | 44 |
|  | 0.5 | 100 | 18 |
|  | 0.75 | 99 | 5 |
|  | 1.0 | 99 | 1 |
| 1100 | 0 | 100 | 78 |
|  | 0.75 | 100 | 23 |
|  | 1.0 | 100 | 7 |
|  | 1.13 | 100 | 1 |
|  | 1.25 | 99 | 1 |
|  | 1.5 | 98 | 0 |
| 1200 | 0 | 100 | 78 |
|  | 0.75 | 100 | 31 |
|  | 1.0 | 100 | 15 |
|  | 1.13 | 100 | 7 |
|  | 1.25 | 99 | 2 |
|  | 1.5 | 98 | 0 |

The tests reveal that the Ca demand increases with temperature. This is due to the different behavior of Fe, which in case of a temperature increase forms Fe-P compounds having increasingly higher Fe contents so that the amount of P which combines with the Fe is progressively decreased and the amount of P which does not combine with Fe but must be combined with Ca is progressively increased and the Ca demand increases in case of a temperature rise. Besides, an influence is exerted by other compounds, such as Na or Mg, which are contained in the phosphating process sludge in relatively small amounts and which form P compounds having a lower thermal stability. Such compounds are decomposed as the temperature increases so that the Ca demand increases in accordance therewith.

It has been found that a Ca demand can be definitely stated only for temperature $\geq 1100°$ C. and theoretically amounts to $$\text{moles Ca demand} = \left(P - \frac{Fe}{2}\right)$$

In practice, a surplus should be employed. The addition of Ca may be smaller at lower temperatures; this is suitably checked by routine tests during commercial operation.

It will be understood that the specification and examples are illustrative but not limitative of the present invention and that other embodiments within the spirit and scope of the invention will suggest themselves to those skilled in the art.

We claim:

1. A process of removing zinc from a phosphating process sludge comprising:
    forming a mixture of the sludge with an additive, said additive being a substance capable of forming a solid non-volatile compound of iron, calcium and/or barium with a phosphorus component of the sludge at an elevated temperature; and
    reacting the mixture at a temperature of at least 800° C. under reducing conditions whereby zinc is removed from said mixture and the phosphorus component is converted to said non-volatile compound of iron, calcium and/or barium.

2. The process of claim 1 wherein the mixture is reacted at a temperature of at least 900° C.

3. The process of claim 1 wherein the mixture is reacted at a temperature of at least 1000° C.

4. The process of claim 1 wherein the mixture is reacted at a temperature of at least 1100° C.

5. The process of claim 1 wherein the additive is an iron compound which forms a slaglike iron-containing compound with the phosphorus component of the sludge 6. The process of claim 5 wherein the selected Fe/P molar ratio of the mixture is 1.0 in case of a reaction temperature of $\leq 950°$ C., is 1.5 in case of a reaction temperature of 950° to 1050° C., and is 2.0 in case of a reaction temperature of $\geq 1050°$.

7. The process of claim 1 wherein the sludge is reacted with an oxide compound rich in iron.

8. The process of claim 7 wherein the oxide compound is iron ore, iron oxide, roll scale and/or scrap.

9. The process of claim 1 wherein the additive is metallurgical dust.

10. The process of claim 1 wherein for a formation of Ca and/or Ba slaglike compounds the additive is a Ca or Ba compound and is present in a molar ratio of Ca:P or Ba:P of at least 1.5.

11. The process of claim 1 wherein the mixture is compacted to form pellets or briquettes.

12. The process of claim 1 wherein the reducing conditions are established by means of a solid fuel.

13. The process of claim 12 wherein the solid fuel is mixed with the sludge and the additive.

14. The process of claim 13 wherein the mixture of sludge, additive, and solid fuel is compacted to form pellets or briquettes.

* * * * *

UNITED STATES PATENT AND TRADEMARK OFFICE
CERTIFICATE OF CORRECTION

PATENT NO. : 5,198,020
DATED : March 30, 1993
INVENTOR(S) : Wolfgang Fennemann et al It is certified that error appears in the above-identified patent and that said Letters Patent is hereby corrected as shown below:

Column 2, line 67, "$Fe_2P$" should read --$Fe_3P$--.

Signed and Sealed this

Twelfth Day of July, 1994

Attest:

BRUCE LEHMAN

*Attesting Officer*    *Commissioner of Patents and Trademarks*